United States Patent
Tokunaga et al.

(10) Patent No.: US 10,811,902 B2
(45) Date of Patent: Oct. 20, 2020

(54) ENERGY PLANNING SYSTEM AND ENERGY PLANNING METHOD CONSIDERING A TIMING OF A CHANGE IN A TOTAL NUMBER OF RESIDENTS IN A HOME

(71) Applicant: PANASONIC INTELLECTUAL PROPERTY MANAGEMENT CO., LTD., Osaka (JP)

(72) Inventors: Yoshihiko Tokunaga, Hyogo (JP); Masakazu Adachi, Osaka (JP); Fumikazu Kurihara, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 189 days.

(21) Appl. No.: 15/517,860

(22) PCT Filed: Oct. 9, 2015

(86) PCT No.: PCT/JP2015/005130
§ 371 (c)(1),
(2) Date: Apr. 7, 2017

(87) PCT Pub. No.: WO2016/056243
PCT Pub. Date: Apr. 14, 2016

(65) Prior Publication Data
US 2017/0310161 A1    Oct. 26, 2017

(30) Foreign Application Priority Data
Oct. 10, 2014    (JP) ................. 2014-209401

(51) Int. Cl.
| G06Q 30/02 | (2012.01) |
| H02J 3/00 | (2006.01) |
| H02J 13/00 | (2006.01) |
| G06Q 10/00 | (2012.01) |
| H02J 3/14 | (2006.01) |
| G05B 13/04 | (2006.01) |

(Continued)

(52) U.S. Cl.
CPC .......... *H02J 13/0079* (2013.01); *G05B 13/04* (2013.01); *G05F 1/10* (2013.01);
(Continued)

(58) Field of Classification Search
CPC ...... H02J 13/0079; H02J 3/14; H02J 13/0006; H02J 3/12; H02J 13/00; H02J 2003/146;
(Continued)

(56) References Cited

U.S. PATENT DOCUMENTS 9,218,632 B2 * 12/2015 Venkatakrishnan ... G06Q 50/06
9,569,804 B2 *  2/2017 Stein .................... H02J 13/0017
(Continued)

FOREIGN PATENT DOCUMENTS

| JP | 2003-271801 A | 9/2003 |
| JP | 2004-030002 A | 1/2004 |

(Continued)

OTHER PUBLICATIONS

JP-2008158701-A "English Machine Translation" (Year: 2008).*
(Continued)

*Primary Examiner* — Robert E Fennema
*Assistant Examiner* — Marzia T Monty
(74) *Attorney, Agent, or Firm* — McDermott Will & Emery LLP

(57) ABSTRACT

An energy planning system that proposes an appropriate energy plan for a home includes: a sensor that senses a state of an energy facility in a home; a predictor that predicts a future lifestyle of a resident of the home; and a proposer that determines information about an energy plan for the home based on a result of the sensing by the sensor and the lifestyle predicted by the predictor, and outputs the information.

17 Claims, 7 Drawing Sheets

(51) Int. Cl.
- *G05F 1/10* (2006.01)
- *G06Q 50/06* (2012.01)
- *H02J 3/12* (2006.01)
- *G05B 15/02* (2006.01)

(52) U.S. Cl.
CPC ......... *G06Q 10/00* (2013.01); *G06Q 30/0202* (2013.01); *G06Q 50/06* (2013.01); *H02J 3/00* (2013.01); *H02J 3/12* (2013.01); *H02J 3/14* (2013.01); *H02J 13/00* (2013.01); *H02J 13/0006* (2013.01); *G05B 15/02* (2013.01); *H02J 3/003* (2020.01); *H02J 2203/20* (2020.01); *H02J 2310/14* (2020.01); *H02J 2310/64* (2020.01)

(58) Field of Classification Search
CPC ........... H02J 2003/007; H02J 2003/003; H02J 2003/143; G06Q 30/0202; G06Q 50/06; G05B 13/04; G05F 1/10
See application file for complete search history.

(56) References Cited

U.S. PATENT DOCUMENTS

| | | |
|---|---|---|
| 2006/0276938 A1 | 12/2006 | Miller |
| 2011/0231320 A1 | 9/2011 | Irving |
| 2012/0330472 A1* | 12/2012 | Boot ..................... G06Q 50/06 700/291 |
| 2013/0006831 A1* | 1/2013 | Mise ..................... G06Q 10/06 705/37 |
| 2013/0297555 A1* | 11/2013 | Fadell ..................... H04Q 9/00 706/52 |
| 2014/0277769 A1* | 9/2014 | Matsuoka ........... H04L 12/2818 700/278 |
| 2015/0057820 A1* | 2/2015 | Kefayati ................ G06Q 50/06 700/291 |

FOREIGN PATENT DOCUMENTS

| | | |
|---|---|---|
| JP | 2005-284852 A | 10/2005 |
| JP | 2008-158701 A | 7/2008 |
| JP | 2014-071654 A | 4/2014 |

OTHER PUBLICATIONS

International Search Report and Written Opnion issued in International Patent Application No. PCT/JP2015/005130, dated Dec. 22, 2015; with partial English translation.

Examination Report No. 1 for Standard Patent Application, dated Jan. 19, 2018, issued in corresponding Australian Patent Application No. 2015329459.

\* cited by examiner

FIG. 3
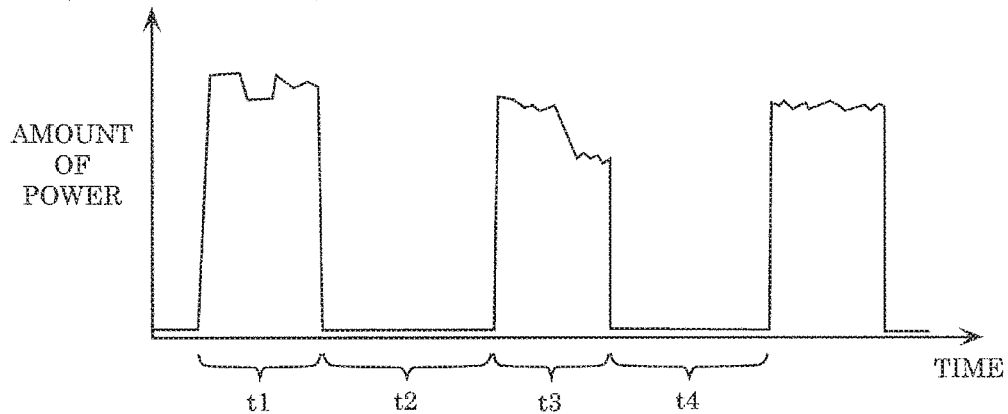
FIG. 4
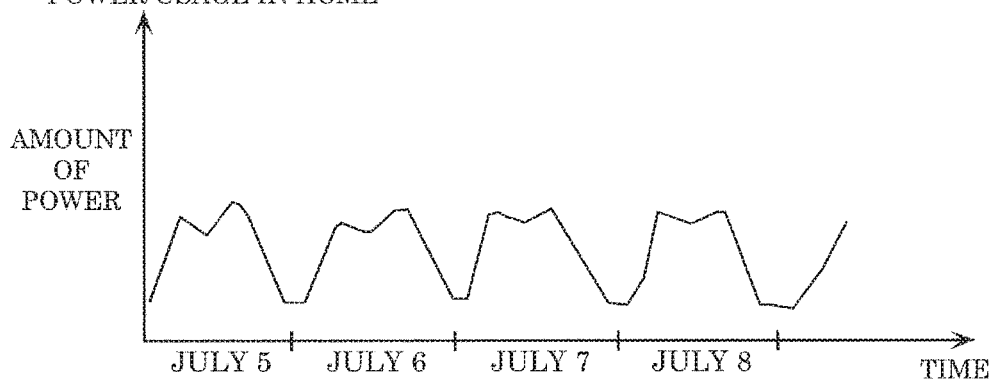
FIG. 5
FACILITY PRICE INFORMATION
| ENERGY FACILITY | PRICE |
|---|---|
| POWER GENERATION DEVICE A (SOLAR CELL MODULE, CAPACITY 5 kW) | a YEN |
| POWER GENERATION DEVICE B (SOLAR CELL MODULE, CAPACITY 3 kW) | b YEN |
| ⋮ | ⋮ |
| POWER STORAGE DEVICE X (CAPACITY 5 kW) | x YEN |
| ⋮ | ⋮ |

FIG. 6

ENERGY PURCHASE PRICE INFORMATION

| ENERGY-RELATED SERVICE TYPE | PRICE INFORMATION |
|---|---|
| STANDARD SERVICE (SIMPLE METERED RATE SYSTEM) | UNIT PRICE INFORMATION BY CONTRACTED MAXIMUM POWER |
| ALL-ELECTRIC SERVICE (TIME-OF-DAY RATE SYSTEM) | UNIT PRICE INFORMATION BY TIME OF DAY |
| ⋮ | ⋮ |
| DR INCENTIVE DISCOUNT SERVICE | DISCOUNT PRICE INFORMATION |
| ⋮ | ⋮ |

ENERGY PLANNING SYSTEM AND ENERGY PLANNING METHOD CONSIDERING A TIMING OF A CHANGE IN A TOTAL NUMBER OF RESIDENTS IN A HOME

RELATED APPLICATIONS

This application is the U.S. National Phase under 35 U.S.C. § 371 of International Patent Application No. PCT/JP2015/005130, filed on Oct. 9, 2015, which in turn claims the benefit of Japanese Application No. 2014-209401, filed on Oct. 10, 2014, the disclosures of which Applications are incorporated by reference herein.

TECHNICAL FIELD

The present invention relates to techniques of managing energy such as electricity and gas in a home, and particularly relates to an energy planning system and energy planning method for formulating a plan about the use, generation, etc. of energy in a home.

BACKGROUND ART

A home energy management system (HEMS) for managing energy in a home has been conventionally known. In the HEMS, a HEMS controller controls one or more HEMS appliances in the home via a home area network (HAN), for a reduction in energy consumption and the like. In the HEMS, for example, power usage in the home is measured and the measurement result is displayed on a HEMS appliance in the home so that the resident (or residents) recognizes the power usage.

A display device that calculates and displays electricity charges based on: measurement results from a power measurement device for measuring the amount of power purchased from a commercial power system and the amount of power sold to the power system; and the unit price of power has also been conventionally known (see Patent Literature (PTL) 1).

CITATION LIST

Patent Literature

PTL 1: Japanese Unexamined Patent Application Publication No. 2008-158701

SUMMARY OF THE INVENTION

Technical Problem

Even though the resident of the home can recognize the power usage from the HEMS and recognize the electricity charges from the display device in PTL 1, the resident has difficulty in knowing whether or not energy management is necessary in the home, what kind of energy management is desirable, etc. Since energy demand differs depending on various circumstances of each individual home, there is no uniform energy plan appropriate for every home.

The present invention accordingly provides an energy planning system that proposes an appropriate energy plan for a home. The present invention also provides an energy planning method and energy planning device relating to the energy planning system.

Solution to Problem

An energy planning system according to an aspect of the present invention is an energy planning system including: a sensor that senses a state of an energy facility in a home; a predictor that predicts a future lifestyle of a resident of the home; and a proposer that determines information about an energy plan for the home based on a result of the sensing by the sensor and the lifestyle predicted by the predictor, and outputs the information.

An energy planning method according to an aspect of the present invention is an energy planning method executed by one or more computers, the energy planning method including: sensing a state of an energy facility in a home; predicting a future lifestyle of a resident of the home; and determining information about an energy plan for the home based on a result of the sensing and the lifestyle predicted in the predicting, and outputting the information.

An energy planning device according to an aspect of the present invention is an energy planning device including: a sensor that senses a state of an energy facility in a home; a predictor that predicts a future lifestyle of a resident of the home; and a proposer that determines information about an energy plan for the home based on a result of the sensing by the sensor and the lifestyle predicted by the predictor, and outputs the information.

Advantageous Effect of Invention

The energy planning system, etc. according to the present invention output information about an appropriate energy plan for each individual home.

BRIEF DESCRIPTION OF DRAWINGS

FIG. 3 is a graph illustrating the operation performance of an energy facility.

FIG. 4 is a graph illustrating power usage in a home.

FIG. 5 is a diagram illustrating the structure of facility price information and an example thereof.

FIG. 6 is a diagram illustrating the structure of energy purchase price information and an example thereof.

DESCRIPTION OF EXEMPLARY EMBODIMENT

Embodiment 1

The following describes an embodiment with reference to drawings. The embodiment described below shows a specific example of the present invention. The numerical values, shapes, materials, structural elements, the arrangement and connection of the structural elements, steps, the processing order of the steps, etc. shown in the following embodiment are mere examples, and do not limit the scope of the present invention. Of the structural elements in the embodiment described below, the structural elements not recited in any one of the independent claims are described as optional structural elements that may be added. Note that each drawing is a schematic and does not necessarily provide precise depiction.

An energy planning system according to an embodiment of the present invention is described below.

(Structure)

Figure 1:
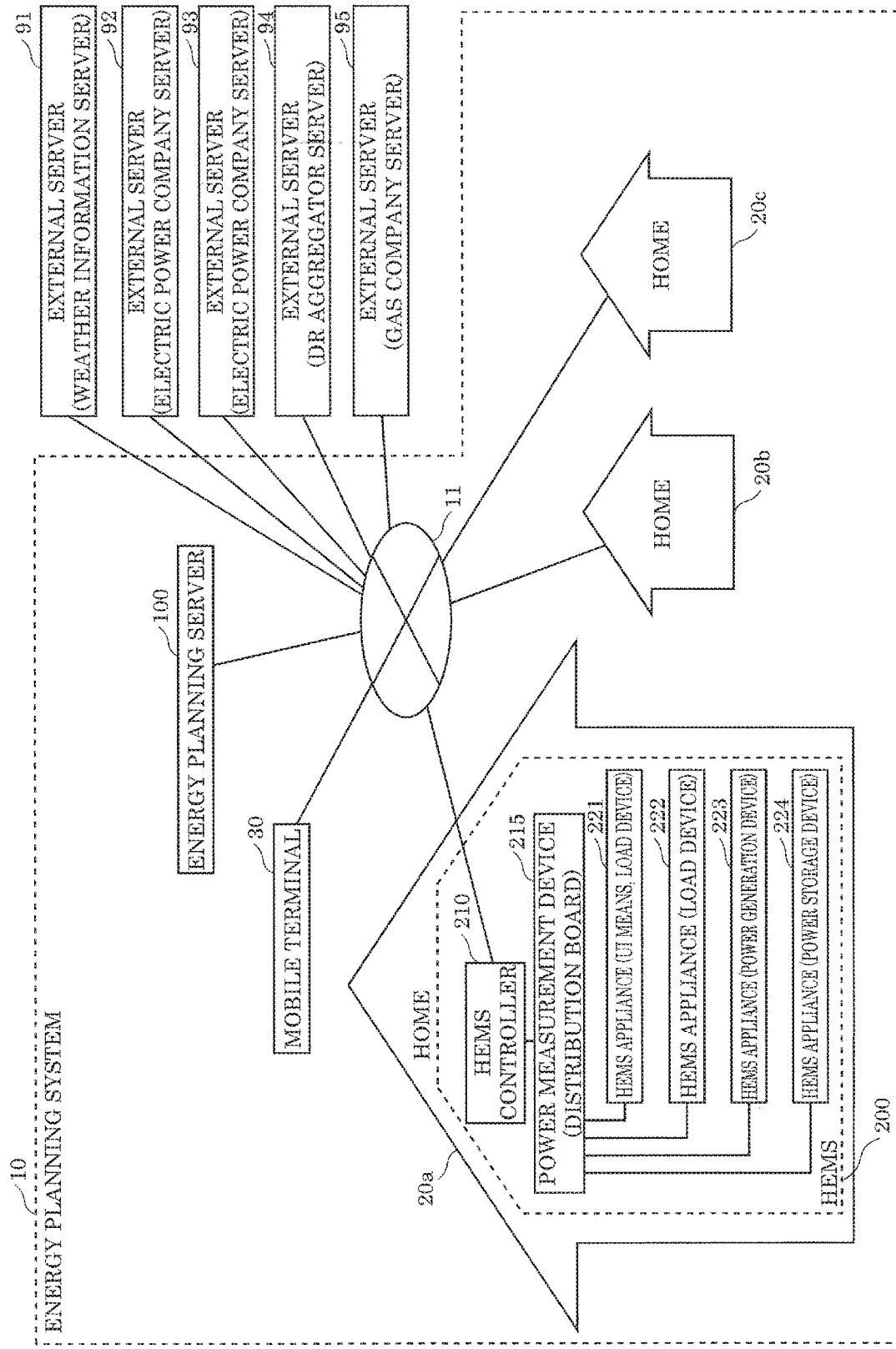
FIG. 1 is a system schematic diagram illustrating a device group relating to an energy planning system according to an embodiment.

FIG. 1 is a system schematic diagram illustrating a device group relating to energy planning system 10 according to the embodiment. In energy planning system 10 illustrated in FIG. 1, HEMS 200 installed in each home (such as home 20a, 20b, or 20c), energy planning server 100, and mobile terminal 30 can communicate with each other via network 11. Energy planning server (energy planning device) 100 can also communicate with an external server group via network 11. Network 11 includes a wide area network such as the Internet.

Energy planning system 10 with the structure illustrated in FIG. 1 is a system having a function of executing an energy planning method and proposing an appropriate energy plan for each home. The energy plan mentioned here is a plan about the generation, retention, and use of energy such as electricity or gas at one or more points in time in the future. Examples of the energy plan include a plan to introduce an energy facility and a plan to receive an energy-related service. The energy facility is a facility having a function of any of generating, retaining, and using energy. Examples of the energy facility include an electric appliance, a power generation system (e.g. solar cell module), a power storage system, a battery charger for an electric vehicle, and a fuel cell. The energy-related service is a service about energy purchase and sale by an energy supplier such as an electric power company, and involves, for example, a contract for energy purchase and sale. Examples of the energy-related service include a standard service of simple metered rate for electricity charges and various discount services for discounting electricity charges under predetermined conditions. Although this embodiment mainly describes electric energy as an example of energy, other energy such as gas can be treated in the same way as electric energy in energy planning.

As illustrated in FIG. 1, HEMS 200 includes HEMS controller 210, power measurement device 215, and a HEMS appliance group. Power measurement device 215 is a device that is provided in, for example, a distribution board in home 20a for dividing power supplied from a power system and has an electric circuit such as a current sensor for measuring power consumed by an electric appliance connected to each branch circuit or surplus power output from a power generation device to the power system side. The electric appliance mentioned here includes a HEMS appliance. For example, power is divided for each room (e.g. a bedroom, an entrance) of home 20a or for each part (e.g. an air-conditioner installation part, a heat pump water heater installation part) of the room. HEMS controller 210 is a device that is housed in the distribution board as an example, and obtains measurement results from power measurement device 215 and controls the HEMS appliances under pre-determined conditions for a reduction in energy consumption and the like. HEMS controller 210 has a function of transmitting data obtained from the HEMS appliances and measurement results obtained from power measurement device 215 to energy planning server 100 via network 11. HEMS controller 210 includes memory, a communication circuit, and a central processing unit (CPU). Each HEMS appliance is an energy facility from an energy perspective.

The HEMS appliances include load device 221 having user interface (UI) means, load device 222, power generation device 223, and power storage device 224. Load device 221 has UI means (a display, a touch panel, a keyboard, etc.) for receiving input from the resident (or residents, hereafter the same) of the home and presenting information (e.g. video display, audio output), and is a tablet, a monitor, or the like. For example, load device 221 can display data such as power consumption (power usage) obtained from power measurement device 215 by HEMS controller 210 in HEMS 200. This makes the power usage and the like visible to the resident of home 20a, thus realizing "energy visualization". Load device 222 is, for example, an electric appliance such as a lighting, an air-conditioner, a refrigerator, a heat pump water heater, an electromagnetic cooker, or a TV receiver or a battery charger for an electric vehicle, and consumes power in operation. Power generation device 223 is, for example, a solar cell module for solar power generation, and generates power. For example, the power generated by power generation device 223 is consumed by other energy facilities (load device 221, load device 222, etc.) and, if there is a surplus, the surplus power is sold to the electric power company. Power storage device 224 is a device for efficiently using power through charge and discharge or preparing for a power failure, and is a lithium-ion power storage system as an example. For example in the case where power is provided from the electric power company in a time-of-day rate system as an all-electric service or the like, power storage device 224 charges during a time period when the power purchase price is low, and discharges during a time period when the power purchase price is high to supply power to load device 222 and the like. Thus, power storage device 224 releases stored power so as to be consumed by load device 222 and the like. Home 20b and home 20c each include a HEMS corresponding to HEMS 200, as in home 20a. Although the above describes an example where power generation device 223 and power storage device 224 are provided in home 20a, there may be a home in which a power generation device or a power storage device is not included in the HEMS appliance group in the HEMS.

Mobile terminal 30 is a terminal device (e.g. a smartphone) including input means such as a touch panel, a display, memory, a communication circuit, and a CPU.

Energy planning server 100 is a server device including a recording device such as a hard disk, memory, a communication circuit, and a CPU. The memory is ROM holding programs and data beforehand, RAM used to store data and the like during program execution, and the like, and may include nonvolatile memory as an example. The CPU executes a program stored in the memory, to control the communication circuit and the like and perform an energy planning process. Energy planning server 100 has a function of obtaining data from the HEMS controller in each home and, for each home, formulating an energy plan and transmitting information about the formulated energy plan to the HEMS controller in the home. To formulate an energy plan for a home, energy planning server 100 predicts future energy demand in the home based on the states of the energy facilities in the home, the lifestyle of the resident of the home, and the like, and calculates energy cost. The calculation of the energy cost requires a process of analyzing the power generation capacity, power storage capacity, etc. of the energy facilities in the home, a process of estimating changes in energy purchase and sale prices, and so on. Upon formulating the energy plan, energy planning server 100 obtains information from the external server group for reference.

The external server group includes, for example, weather information server 91, electric power company server 92 of one electric power company, electric power company server 93 of another electric power company, DR aggregator server 94, gas company server 95, and other external servers (not illustrated). Weather information server 91 is a server device that provides climate information such as regional weather. The climate information can be used, for example, to calculate power generation by a solar cell module. Electric power company server 92 and electric power company server 93 are server devices that are installed in different electric power companies and each provide information (e.g. information about an energy purchase and sale contract defining power charges and the like) about an energy-related service offered by the electric power company and the like. DR (demand response) aggregator server 94 is a server device that is operated by a DR aggregator and provides information about a transaction for changing the power consumption pattern in the home in order to, for example, prevent a power supply shortage during peak time of power consumption. Gas company server 95 is a server device that provides information about gas charges. Electric power company server 92, electric power company server 93, DR aggregator server 94, and the other external servers provide energy measure information indicating a future plan relating to energy. For example, the energy measure information is information indicating a plan about a matter that influences the balance such as the introduction, operation, etc. of an energy facility at one or more points in time in the future, and includes information about future energy prices. Examples of such energy measure information include information indicating an implementation plan to subsidize the introduction of an energy facility, and information indicating the time to change the power sale price and the details of the change. The energy measure information may be information indicating a plan about a matter that influences the balance such as the introduction, operation, etc. of an energy facility at present. Examples of such energy measure information include information indicating a subsidy currently offered to the introduction of an energy facility, and information indicating the current power sale price.

Figure 2:
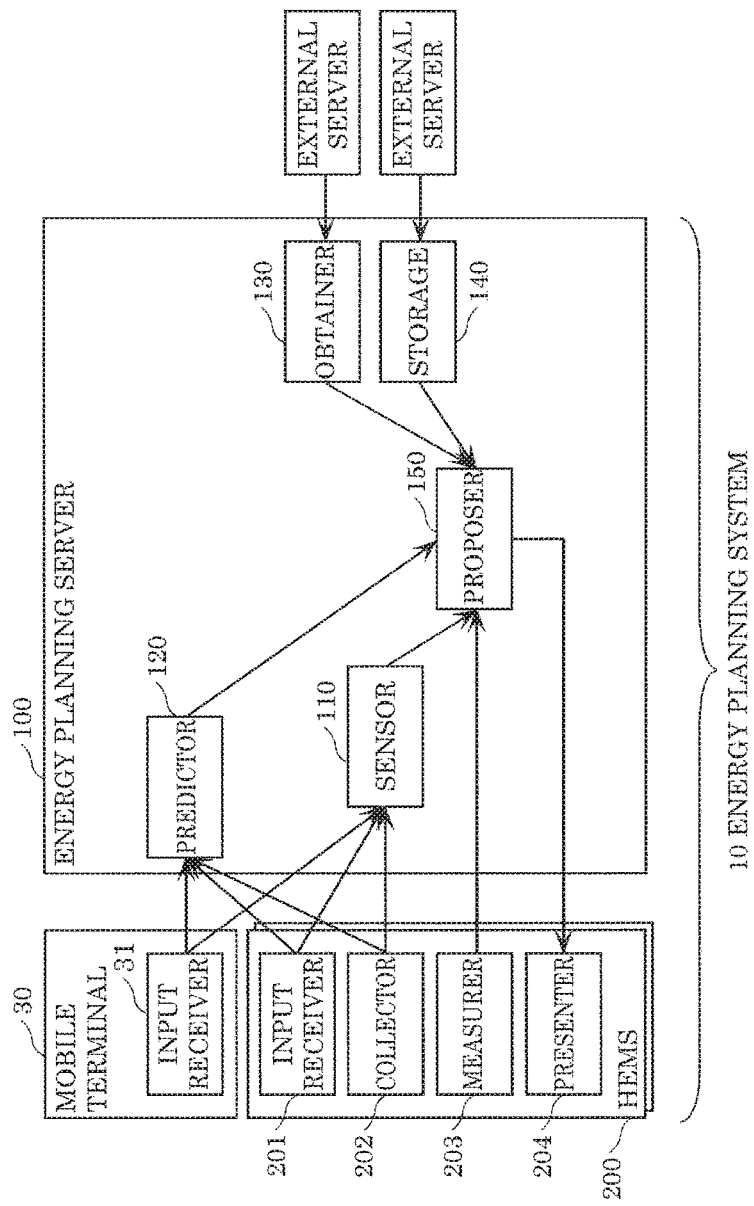
FIG. 2 is a functional block diagram of the energy planning system.

FIG. 2 is a functional block diagram of the energy planning system. The functionally main structural elements of energy planning server 100, mobile terminal 30, and HEMS 200 described above are illustrated in this functional block diagram.

Mobile terminal 30 functionally includes input receiver 31, as illustrated in FIG. 2. Input receiver 31 includes input means, a CPU, a communication circuit, etc., and has a function of transmitting input information to energy planning server 100 via network 11.

HEMS 200 functionally includes input receiver 201, collector 202, measurer 203, and presenter 204, as illustrated in FIG. 2.

Input receiver 201 is mainly realized by load device 221 having UI means and HEMS controller 210, and has a function of transmitting information input by the resident of home 20a to energy planning server 100 via network 11. For example, input receiver 201 receives input information indicating a future change of the resident of home 20a (e.g. information about a change in family composition or about a load device the resident is planning to purchase). Such information may be input through input receiver 31 in mobile terminal 30.

Collector 202 is realized by power measurement device 215 and HEMS controller 210, and has a function of collecting data of power consumption, etc. by one or more energy facilities connected to each branch circuit in home 20a, which has been measured by power measurement device 215. The data of power consumption, etc. by an energy facility may include data of the amount of power output from an energy facility such as a power generation device to the power system side. In other words, collector 202 has a function of collecting data about the operation performance of each energy facility (HEMS appliance), for each branch circuit. Collector 202 also has a function of transmitting the collected data to energy planning server 100 via network 11. FIG. 3 is a graph illustrating temporal changes in power consumption of a HEMS appliance (e.g. an air conditioner) as a result of the measurement by power measurement device 215. In the drawing, the power consumption is a constant low standby power value (e.g. 2 W) in time t2 and time t4, and a higher power value in time t1 and time t3 than in time t2 and time t4. Power measurement device 215 sequentially measures the amount of power, and accumulates the measurement results. Hence, the time period when each type of HEMS appliance in home 20a is in operation and the time period when the HEMS appliance is on standby can be determined from the measurement results, with it being possible to determine its operation status (such as changes in the time period when the HEMS appliance is in operation) for a duration of time such as month or year.

Measurer 203 is realized by power measurement device 215 and HEMS controller 210, and has a function of measuring overall power usage in home 20a and transmitting the measurement result to energy planning server 100 via network 11. HEMS controller 210 combines power consumption, etc. in each branch circuit measured by power measurement device 215, to obtain overall power usage in home 20a. FIG. 4 is a graph illustrating power usage in a home. Energy planning server 100 can obtain information of power usage associated with time as illustrated in the drawing, from measurer 203.

Presenter 204 is realized by HEMS controller 210 and load device 221 having UI means such as a tablet, and has a function of presenting (e.g. on a display) information received from energy planning server 100.

Energy planning server 100 includes functional structural elements such as sensor 110, predictor 120, obtainer 130, storage 140, and proposer 150, as illustrated in FIG. 2. Each functional structural element is described below, using an example where energy planning server 100 obtains data from HEMS controller 210, etc. in home 20a and formulates an energy plan for home 20a.

Sensor 110 is realized by the communication circuit, the CPU executing the program, and the like, and has a function of sensing the state of each energy facility in home 20a and notifying the state to proposer 150. Examples of the state of each energy facility in home 20a include the identification information (product number, product name, etc.), type (such as a power generation device, a power storage device, or a load device), and duration of use of the energy facility installed in home 20a. For example, sensor 110 obtains the data of the operation performance of the energy facility collected by collector 202 in HEMS 200, and senses the state of the energy facility in home 20a from the data. Sensor 110 may also sense the state of the energy facility in home 20a based on input information received by input receiver 201 in HEMS 200 or input receiver 31 in mobile terminal 30. This input information indicates the state of the energy facility. Sensor 110 may, through communication with mobile terminal 30 or HEMS controller 210, cause a HEMS appliance or mobile terminal 30 to display a questionnaire screen including questions and the like for prompting the resident of home 20*a* to input the input information.

Predictor 120 is realized by the communication circuit, the CPU executing the program, and the like, and has a function of predicting the future lifestyle of the resident (i.e. a set of one or more residents) of home 20*a* and notifying the prediction result to proposer 150. The lifestyle of the resident of home 20*a* includes the family composition (the number of members, age, etc.), staying-at-home time period, and sleeping time period of the resident of home 20*a*. For example, predictor 120 obtains the data of the operation performance of the energy facility collected by collector 202 in HEMS 200, recognizes the state of the lifestyle of the resident of home 20*a* to the present (change tendency, etc.) from the data, and predicts the future lifestyle. Predictor 120 may, for example, estimate the staying-at-home time period of the resident from temporal changes in power consumption of an air conditioner or the like (see FIG. 3), estimate the sleeping time period of the resident from temporal changes in power consumption of a lighting in a bedroom or the like, and estimate the number of residents from overall power usage, etc. Predictor 120 may predict the future lifestyle of the resident of home 20*a* based on input information received by input receiver 201 in HEMS 200 or input receiver 31 in mobile terminal 30. This input information indicates, for example, a future change of the resident of home 20*a*, such as the time and details of change in family composition or the planned time to purchase an energy facility, etc. used when the resident lives in home 20*a*. Predictor 120 may, through communication with mobile terminal 30 or HEMS controller 210, cause a HEMS appliance or mobile terminal 30 to display a questionnaire screen including questions and the like for prompting the resident of home 20*a* to input the input information.

Obtainer 130 is realized by the communication circuit, the CPU executing the program, and the like, and has a function of obtaining energy measure information from any external server in the external server group via network 11 and notifying the energy measure information to proposer 150.

Storage 140 is realized by the recording device, the memory, and the like, and has a function of storing facility price information indicating the price of one or more energy facilities and energy purchase price information indicating an energy purchase price in one or more energy-related services. FIG. 5 is a diagram illustrating the structure of facility price information 50 and an example thereof. As illustrated in the drawing, facility price information 50 includes a plurality of pairs of energy facility 51 and price 52 each as information about a power generation device or a power storage device. Energy facility 51 is information for identifying the power generation device or power storage device. Price 52 indicates the price of the power generation device or power storage device. FIG. 6 is a diagram illustrating the structure of energy purchase price information 60 and an example thereof. As illustrated in the drawing, energy purchase price information 60 includes a pair of energy-related service type 61 and price information 62 for each energy-related service. Energy-related service type 61 is information for identifying the energy-related service. Price information 62 indicates the unit price in the energy-related service. If the unit price in the service varies depending on condition, price information 62 indicates the correspondence between the condition and the unit price, etc. As an example, in the case of a standard service using a simple metered rate system, the unit price is a yen (Japanese yen) when the contracted maximum amount of power is within predetermined range A (e.g. 150 kWh or less), and b yen higher than a yen when the contracted maximum amount of power is within range B higher than predetermined range A. Moreover, for example in a DR (demand response) incentive discount service, price information 62 indicates that the unit price of power is discounted to c yen if a specific power generation device or the like corresponding to a power reduction request has been introduced according to a contract with the DR aggregator. In DR (demand response), the price may vary depending on whether a power reduction request is made on the previous day or the current day. Price information 62 may include information such as a rate structure by the time of day (time period) or by the day of week, a rate structure in combination with the purchase of an energy facility, or a rate structure under a high-voltage power receiving contract in a collective housing or the like. Energy planning server 100 may obtain facility price information and energy purchase price information from any external server in the external server group, and store the information in storage 140.

Proposer 150 is realized by the communication circuit, the CPU executing the program, and the like, and has a function of formulating an energy plan for the home based on the sensing result by the sensor 110 and the lifestyle predicted by predictor 120 and outputting information about the energy plan. In detail, based on the state of each energy facility in home 20*a*, the lifestyle of the resident of home 20*a*, and the like, proposer 150 predicts future energy demand in home 20*a*, calculates energy cost, and determines an energy plan. Information about the determined energy plan is transmitted from proposer 150 to HEMS controller 210, and so can be presented by presenter 204.

(Operation)

Energy planning operation in energy planning system 10 having the aforementioned structure is described below, with reference to FIG. 7. Although the following description uses an example of formulating an energy plan for home 20*a*, the same applies to homes 20*b* and 20*c*, etc.

Figure 7:
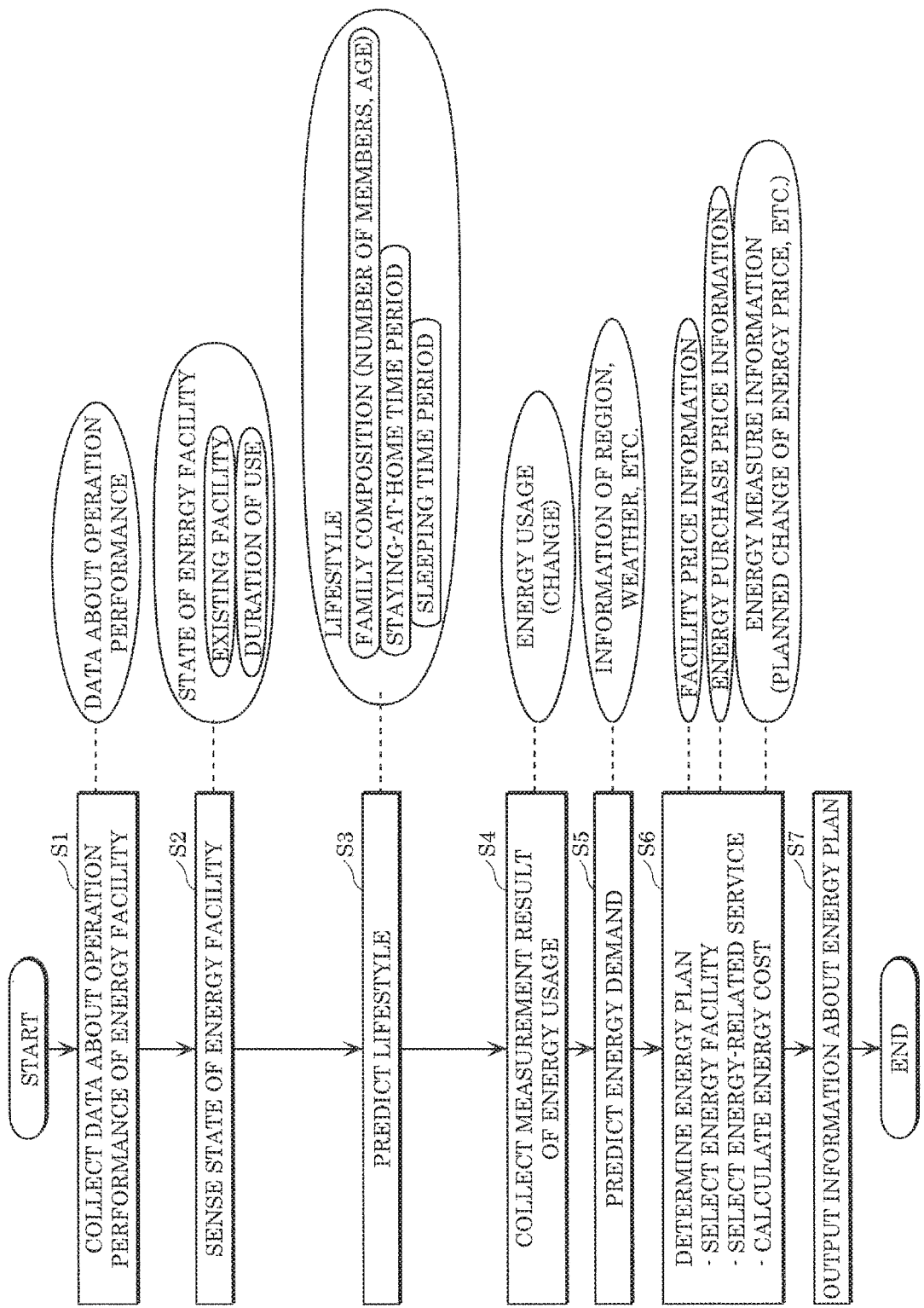
FIG. 7 is a flowchart illustrating the operation of the energy planning system.

FIG. 7 is a flowchart illustrating the operation of energy planning system 10. Data used in each step, etc. are also illustrated in the drawing. For example, this operation may be periodically performed every few months, or performed when the resident of home 20*a* operates HEMS 200, such as load device 221 (a tablet or the like), to request an energy plan. Alternatively, the operation in FIG. 7 may be performed in the case where any of the information used for formulating the energy plan, such as energy measure information, facility price information, and energy purchase price information, is updated in the external server group.

First, collector 202 in HEMS 200 collects data about the operation performance of each energy facility in home 20*a* (Step S1).

Next, sensor 110 in energy planning server 100 senses the state of each energy facility in home 20*a*, based on information obtained from collector 202, input receiver 201, or input receiver 31 (Step S2). The type, duration of use, etc. of each energy facility in home 20*a* are thus sensed. The sensing result is notified to proposer 150.

Predictor 120 in energy planning server 100 predicts the future lifestyle of the resident of home 20*a*, based on information obtained from collector 202, input receiver 201, or input receiver 31 (Step S3). The current lifestyle such as the family composition (the number of members, age, etc.), staying-at-home time period, sleeping time period, etc. of the resident, a future change in the lifestyle, and the like are thus predicted. Specific examples of the change which may be predicted include that: the staying-at-home time of the resident who lives alone in home 20*a* will increase by 10 hours on average after 2 years; and the number of residents in home 20a will increase by one after 3 years. Other examples of the change which may be predicted include that: power usage will increase because the resident is planning to purchase an electric vehicle after 3 years; and fuel (energy resource) usage will increase if the resident is planning to purchase a fuel-cell vehicle. Such a prediction result is notified to proposer 150. The lifestyle can be used to estimate the degree of energy demand. For example, the power consumption in home 20a can be estimated to be higher when the number of members in the family composition in home 20a is greater, and estimated to be lower when the members of the family composition are all elderly. Moreover, the power consumption in home 20a can be estimated to be higher when the staying-at-home time of the resident of home 20a is longer. Further, with reference to statistical data obtained as a result of researching the correlation between the sleeping time period and the power consumption, the power consumption can be estimated in association with the sleeping time period of the resident of home 20a.

Proposer 150 in energy planning server 100 collects the measurement result of energy usage to the present, such as power usage measured by measurer 203 in HEMS 200 (Step S4). Any change in energy usage can be recognized from the measurement result.

Proposer 150 collects various information, and predicts future energy demand (i.e. energy usage in the future) in home 20a (Step S5). In detail, proposer 150 predicts the future energy demand based on the state of each energy facility sensed in Step S2, the future lifestyle of the resident predicted in Step S3, the change in energy usage obtained from the measurement result collected in Step S4, and various data (regional climate information, etc.) obtained from the external servers. Here, depending on the type of energy facility, the energy generation or consumption may vary according to the time of day, the season, or the like. Hence, the energy demand may be predicted based on information indicating the feature of the type of energy facility. As the feature of the type of energy facility, for example, a heat pump water heater has a feature of increasing water temperature using power during night time periods. A battery charger for an electric vehicle has a feature of being used mainly during night time periods. An air conditioner has a feature of being used during day to night time periods in summer, used during night to morning time periods in winter, and hardly used in spring and fall.

Proposer 150 then determines an energy plan (Step S6). The energy plan is determined based on the energy demand predicted in Step S5, various data (facility price information, energy purchase price information, energy measure information, etc.) obtained from the external servers, the state of each existing energy facility in home 20a sensed in Step S2, and the like. Such an energy plan that introduces an energy facility such as a power generation device or a power storage device at an effective time or receives an energy-related service at an effective time may be determined in response to the energy demand which varies depending on the future lifestyle predicted in Step S3. The energy plan is determined by, after the calculation of energy cost in the case of maintaining the current state, repeatedly performing the selection of an energy facility, the selection of an energy-related service, and the calculation of energy cost. Energy cost in the case of maintaining the current state is calculated with reference to the current duration of use of each energy facility, power consumption or power generation capacity of the energy facility, energy purchase price information, and the like. At each repetition, energy facilities and energy-related services subjected to selection are changed. For example, an energy facility to be introduced is selected from product list information of power generation devices and power storage devices obtained from an external server, and an energy-related service to be received is selected from service list information obtained from an external server of an electric power company or the like. Energy cost is then calculated based on the future energy demand and the selected energy facility or energy-related service. The energy cost is calculated after analyzing the power generation capacity, power storage capacity, etc. of the selected energy facility and specifying or estimating the energy purchase and sale price based on the duration of use, facility price information, energy purchase price information, energy measure information, etc. of the energy facility. The energy measure information involves, for example, a subsidy for the current power sale price or facility introduction, a future subsidy, or a planned change in energy price. An optimum calculation algorithm for calculating energy cost is set beforehand. For example, regarding the time periods of charging and discharging a power storage device, an appropriate algorithm for reducing energy cost is used. If the calculated energy cost satisfies a predetermined condition, an energy plan of introducing the selected energy facility and receiving the selected energy-related service is determined. Any condition may be set as the predetermined condition. An example of the condition is that energy cost is reduced as compared with the case where the new energy facility is not introduced and the new energy-related service is not received. Another example of the condition is that a facility investment necessary to introduce the energy facility can be recouped within a certain period as a result of a reduction in energy cost. In other words, a condition regarding the cost effectiveness of the energy facility may be set. Proposer 150 thus determines an energy plan relating to an energy facility or energy-related service so that the energy cost satisfies the predetermined condition.

Figure 8:
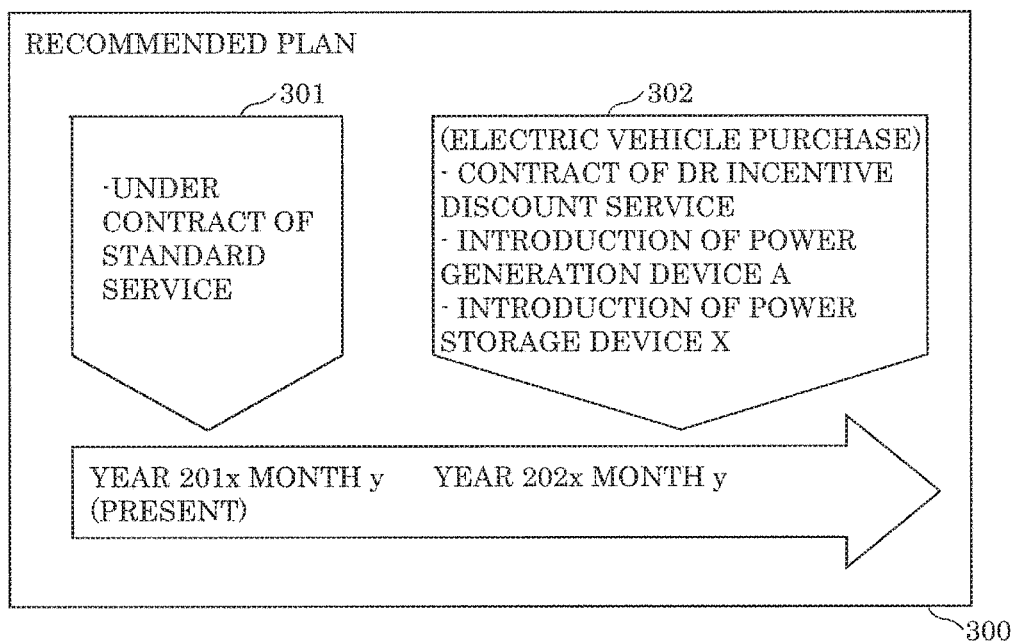
FIG. 8 is a diagram illustrating an example of a screen displaying information about an energy plan.

Proposer 150 outputs information about the energy plan (information of the energy facility to be introduced, information of the energy-related service to be received, etc.) determined in Step S6 (to HEMS controller 210 as an example) (Step S7). Load device 221 (such as a tablet) in home 20a responsively displays the information about the energy plan. FIG. 8 is a diagram illustrating an example of a screen of the information about the energy plan displayed on load device 221. Screen 300 in the drawing includes display elements 301 and 302, and indicates an energy plan recommending introducing power generation device A and power storage device X into home 20a and receiving a DR incentive discount service in year 202x, month y in the future which is, for example, after 3 years. This enables the resident of home 20a to recognize an appropriate energy plan in view of the energy cost in home 20a. An example of the information about the energy plan output in Step S7 is a predicted value of energy cost of energy such as electricity or gas from the present to a predetermined time in the future. Another example of the information about the energy plan output in Step S7 is a predicted value of a reduction (i.e. a potential cost reduction by the energy facility) in energy cost at a predetermined time in the future, a recommended power contract, recommended energy facility introduction or replacement, etc. The information output in Step S7 may include information indicating the current energy management state (such as information about the current number of energy facilities, types, and operation statuses of energy facilities). The period from the present to the predetermined time in the future may be divided into partial periods, for each of which energy cost is calculated and an energy plan is presented. For example, an energy plan may be presented separately for each of the partial periods such as the period of 5 years from the present, the period from 5 years to 15 years from the present, and the period from 15 years to 25 years from the present.

The following describes specific examples of each operation in the aforementioned energy planning (see FIG. 7).

(Lifestyle Prediction)

Specific examples of lifestyle prediction in Step S3 are described below. The prediction method used here is determined beforehand based on statistics through questionnaires and the like.

An example of predicting the family composition which is one element of the lifestyle based on data about the operation performance of each energy facility collected in Step S1 is as follows. In the case where the time period when the overall power consumption (power usage) of the energy facilities in home 20a is highest is a late time period at night of the days before holidays and rarely in the holiday morning, it can be predicted that the number of members in the family composition is 1 or 2. In the case where the time period when the overall power consumption of the energy facilities in home 20a is highest is later than 21:00 at night, it can be predicted that the family composition does not include a primary school child or someone around that age. In the case where the time period when the overall power consumption of the energy facilities in home 20a is highest is around 21:00 at night, it can be predicted that the family composition includes a primary school child or someone around that age and the number of members in the family composition is 3 or more. In the case where the sleeping time period of the resident of home 20a is almost the same on weekdays and holidays, it can be predicted that the family composition only includes elderly. In the case where, as a result of collecting data such as the temporal changes of the power consumption of the lighting in each room, only a resident in a specific room is estimated to go to bed by 21:00, it can be predicted that the family composition includes a pre-school child.

An example of predicting the staying-at-home time which is one element of the lifestyle based on data about the operation performance of each energy facility collected in Step S1 is as follows. In the case where the time period when the overall power consumption (or gas usage) of the energy facilities in home 20a is highest is included in each of the morning, day, and night, it can be predicted that there is a resident who stays at home all day. In the case where the overall power consumption of the energy facilities in home 20a during the day changes periodically, it can be predicted that there is a resident who stays at home or does not stay at home during the day due to shiftwork or the like. In the case where the time period when the overall power consumption of the energy facilities in home 20a is highest is not at night for at least a certain number of days, it can be predicted that there is a resident who frequently stays out overnight.

An example of predicting the family composition which is one element of the lifestyle based on data input by the resident of home 20a is as follows. In the case where the number of residents in home 20a is 1 and he or she is 30 years old according to the input, for example, it can be predicted that the number of members in the family composition will be 2 as a result of marriage after 5 years and 3 as a result of childbirth after 10 years. This prediction can be made by, for example, obtaining statistical data or the like about the average age of marriage and age of childbirth in the region of home 20a from an external server and referencing the data. In the case where the family composition of home 20a is made up of parents and a child according to the input, for example, it can be predicted that the number of members in the family composition will be 2 as a result of the child leaving the home after 20 years and 3 as a result of the child coming back home to live with the parents after 30 years. This prediction can be made by, for example, obtaining statistical data or the like about the average age of a child becoming independent (leaving home) and age of the child living with his or her parents again from an external server and referencing the data. Any change (time and details of change) of the family composition may be predicted based on a questionnaire including various questions the answers of which are input by the resident of home 20a.

(Energy Cost Calculation)

Specific examples of energy cost calculation for determining an energy cost in Step S6 are described below. For example, an energy-related service to be received is selected, and energy cost is calculated based on a contract corresponding to the service.

In the case of a standard service using a simple metered rate system, energy cost is calculated as "the power usage per hour (kWh)×the unit price". Here, the unit price is set depending on the contracted maximum amount of power. In the case of a service (e.g. all-electric service) in which the unit price differs by the time of day and the day of week, energy cost is calculated as a sum total of "the power usage in each time of day in each day of week×the unit price of the time of day and the day of week". In the case of an appliance set discount service that offers a discount under the condition of making a contract in combination with the introduction of at least one specific energy facility, energy cost is calculated, for example, as "the purchase price of the energy facility+ the power usage×the discounted unit price×the number of years of the contract". In the case of a DR incentive discount service under a condition that a specific energy facility corresponding to a power reduction request is introduced, energy cost is calculated, for example, as "the power usage× the discounted unit price×the number of years of the contract", and a specific amount is subtracted each time the power reduction request is made. In the case of a power purchase service of purchasing surplus power (sold power) generated in an energy facility, energy cost is calculated as a negative value of "the amount of power sold×the unit price of sold power". In the case of an electricity gas combined use service that offers a discount under a condition that a specific power facility and gas facility are used in combination, energy cost is calculated as "the power usage×the discounted unit price×the number of years of the contract". There may also be a service (contract) that adds a fixed amount of money as a basic charge to the energy cost.

(Example of Energy Planning)

Specific examples of energy planning for home 20b are described below, assuming that the family composition of the resident of home 20b is made up of four members, that is, the husband, the wife, the eldest son of 18 years old, and the eldest daughter of 15 years old. Currently, a gas water heater and a gasoline-driven vehicle are present in home 20b. Given that there will be no significant change in lifestyle in 5 years from the present, the resident is planning to review a power contract and introduce an energy facility and purchase a new vehicle in the period from 5 years to 15 years from the present. Moreover, given that the family composition is expected to change as a result of the children leaving home in the period from 15 years to 25 years from the present, the resident is planning to introduce an energy facility, purchase an electric vehicle, etc. in this stage, too. The average power usage per month in the past 5 years in home 20b is Xb (kWh). Although the following describes an example of simple predicted calculation of energy cost based on the power usage per month and the ratio of power usage by the time of day (time period) for convenience's sake, prediction accuracy may be enhanced using the performance data of power usage analyzed on a seasonal, monthly, weekly, etc. basis.

First, power cost Z (yen) in 5 years from the present is estimated. The following description limits the energy cost to the power cost, for convenience's sake.

$$Z(\text{yen})=(Xb(\text{kWh})\times\text{simple metered rate system unit price } Ya(\text{yen/kWh})+\text{basic charge } Yb(\text{yen}))\times 12 \text{ (months)}\times 5 \text{ (years)}.$$

Next, power cost Z1 (yen) in the period from 5 years to 15 years from the present is estimated.

Here, a time-of-day rate system service for separate time periods 1 to 3 is selected, and power cost Zt (yen) in the case of receiving the service is calculated. Zt (yen)=Xb×(Yb1×P1+Yb2×P2+Yb3×P3)+basic charge Yb0 (yen)×12 (months)×10 (years). Yb1 to Yb3 are respectively the unit prices (yen/kWh) in time periods 1 to 3, and P1 to P3 are the ratios of power usage (%) in the respective time periods to the total power usage.

In addition, power cost Zp (yen) as an energy plan in the case of introducing a power generation device such as a solar cell module is calculated. Zp (yen)=power generation device introduction cost Cp−(yearly power sale income Y1−yearly power saving amount by self-consumption Y2)×10 (years). Yearly power sale income Y1 is "predicted yearly power generation amount standard value Xp (kWh)×power sale unit price Yp (yen/kWh)". Yearly power saving amount by self-consumption Y2 is "predicted yearly power generation amount standard value Xp (kWh)×self-consumption ratio Pp×(Yb1×P1+Yb2×P2+Yb3×P3)". Self-consumption ratio Pp is the standard value of the ratio of self-consumption to the total power generation amount.

Moreover, power cost Ze (yen) as an energy plan in the case of replacing the gasoline-driven vehicle with an electric vehicle and using the electric vehicle for 10 years is calculated. Let the discount rate in the case of making a contract of receiving an appliance set discount service by the introduction of an electric vehicle be Pe (%) across the board. Then, Ze (yen)=electric vehicle introduction cost Ce+Xb×(Yb1×P1+Yb2×P2+Yb3×P3)×Pe×12 (months)×10 (years). The charge for an appliance set discount service in the case of replacing the gas water heater with a heat pump water heater can be calculated in the same way.

Further, power cost Zd (yen) as an energy plan in the case of optionally contracting a DR incentive discount service based on the introduction of a power generation device and an electric vehicle is calculated. Let the discount rate corresponding to the power generation device and the electric vehicle be Pd (%) across the board, for convenience's sake. Then, Zd (yen)=Xb×(Yb1×P1+Yb2×P2+Yb3×P3)×Pd×12 (months)×10 (years).

Thus, power cost Z1 (yen) for 10 years involving the contract of the time-of-day rate system service, the introduction of the power generation device and the electric vehicle, and the optional contract of the DR incentive discount service is Z1=Zt+Zp+Ze+Zd.

Next, power cost Z2 (yen) in the period from 15 years to 25 years from the present is estimated.

The family composition changes in this period. It is assumed here that the average power usage per month in home 20b is simply proportional to the number of members in the family, for convenience's sake. To enhance the prediction accuracy of power usage after the change in family composition, the calculation may be performed in consideration of the age, sex, etc. of each resident. Power usage Xb2 (kWh) per month in the case where the number of residents decreases from 4 to 2 as a result of the two children marrying and leaving home 20b is Xb2=Xb×2/4.

$$\text{Power cost } Z2(\text{yen}) \text{ is } Z2=Xb2\times(Yb1\times P1+Yb2\times P2+Yb3\times P3)\times 12 \text{ (months)}\times 10 \text{ (years)}.$$

In this stage, too, power cost Zp2 (yen) in the case of introducing a power generation device, power cost Ze2 (yen) in the case of introducing an electric vehicle, and power cost Zd2 (yen) in the case of optionally contracting a DR incentive discount service are calculated. These can be calculated in the same way as the aforementioned Zp, Ze, and Zd, with power usage Xb2 being used instead of power usage Xb.

Moreover, in this stage, for example a power sharing discount service can be optionally contracted in the case where the family of any of the independent children lives in the neighborhood (e.g. within the coverage of the substation of the same electric power company). For example, the power sharing discount service may be applied in the case where the load can be levelled by combining the power consumption patterns of elderly and younger families.

Let the discount rate in the case of receiving the power sharing discount service be Ps (%) across the board. Then, power cost Zs (yen) by the power sharing discount service is Zs=−Xb2×(Yb1×P1+Yb2×P2+Yb3×P3)×12 (months)×10 (years).

Thus, power cost Z2 (yen) involving the contract of the service of the time-of-day rate system, the replacement of the power generation device, the purchase of a new electric vehicle, the contract of the DR incentive discount service, and the contract of the power sharing discount service is Z2=Zt2+Zp2+Ze2+Zd2+Zs.

Each power cost calculated as described above, the calculation conditions, etc. may be output as information about the energy plan in Step S7.

Other Embodiments, Etc

While energy planning system 10 according to Embodiment 1 has been described above, the foregoing embodiment is merely an example, and various changes, additions, omissions, and the like are possible.

Figure 9:
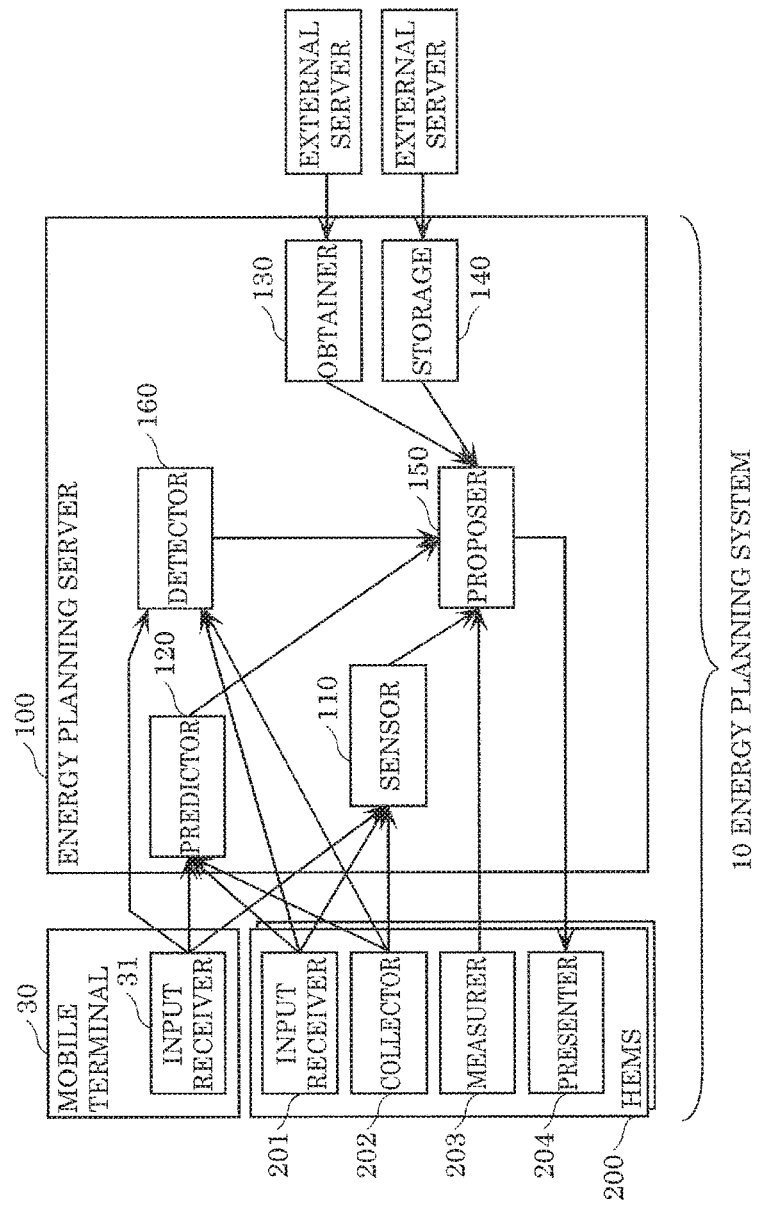
FIG. 9 is a functional block diagram of an energy planning system according to a variation.

The level (type, level of detail, accuracy, information amount, etc.) of information about the energy plan output from proposer 150 in energy planning system 10 may be changed depending on input by the resident of the home to which the information is proposed. In this case, energy planning server 100 may include detector 160 that detects an energy plan necessity level indicating the level at which the resident of the home needs the proposal of the energy plan based on information from input receiver 31, input receiver 201, or collector 202. FIG. 9 is a functional block diagram of an energy planning system in the case of modifying energy planning server 10. Detector 160 is realized by the communication circuit, the CPU executing the program, and the like, and notifies the detected energy plan necessity level to proposer 150. For example, the energy plan necessity level may be estimated by determining the level of interest of the resident on energy consumption reduction based on input of answers to a questionnaire. Proposer 150 determines the level of information output in Step S7, depending on the energy plan necessity level. Proposer 150 may, for example, output a larger amount of information about the energy plan when the energy plan necessity level is higher.

In energy planning system 10 in Embodiment 1, the number of mobile terminals 30 each having input receiver 31 is not limited to one, and may be zero or two or more.

Load device 221 having UI means in Embodiment 1 includes a load device (e.g. a monitor) that has only output means without input means. Such a load device does not function as input receiver 201, but can function as presenter 204.

Measurer 203 in Embodiment 1 may be realized by a smart meter (power meter) and HEMS controller 210. HEMS controller 210 may collect integral power usage per unit time (e.g. every 30 minutes) from the smart meter.

Part or all of the functions (the functions of sensor 110, predictor 120, obtainer 130, storage 140, proposer 150, and detector 160) of energy planning server 100 in Embodiment 1 and the aforementioned variation may be executed by HEMS controller 210. The functions may be divided in any way between HEMS controller 210 and energy planning server 100. All functions of energy planning server 100 may be executed by a device installed in a home. This device may relegate the execution of part of the functions to another device, and obtain the execution result from the other device. For example, the device includes a processor, memory, and input/output means, and realizes the functions of sensor 110, predictor 120, and proposer 150.

The execution order of the processes (FIG. 7) by each device in energy planning system 10 is not limited to the order described above, and the processes may be executed in different order or part of the processes may be omitted without departing from the scope of the present invention. Part or all of the processes (FIG. 7) by each device may be realized by hardware of the device or by software. A process by software is realized by a CPU in the device executing a control program stored in memory. The program may be recorded in a recording medium and distributed or circulated. For example, by installing the distributed control program in a computer and causing a CPU to execute the program, part or all of the processes in FIG. 7 can be performed by the computer.

Any embodiment obtained by combining the structural elements and functions in the foregoing embodiments is also included in the scope of the present invention.

General and specific aspects of the present invention include a device, a system, a method, an integrated circuit, a computer program, a computer-readable recording medium, and any combination thereof.

The following describes the structures, variations, advantageous effects, etc. of an energy planning system according to an aspect of the present invention and an energy planning method and control program relating to the energy planning system.

(1) An energy planning device (energy planning server 100) according to an aspect of the present invention includes: sensor 110 that senses a state of an energy facility in home 20a, 20b, 20c, or the like; predictor 120 that predicts a future lifestyle of a resident of the home; and proposer 150 that determines information about an energy plan for the home based on a result of the sensing by sensor 110 and the lifestyle predicted by predictor 120, and outputs the information. Energy planning system 10 according to an aspect of the present invention is an energy planning system including: sensor 110 that senses a state of an energy facility in home 20a, 20b, 20c, or the like; predictor 120 that predicts a future lifestyle of a resident of the home; and proposer 150 that determines information about an energy plan for the home based on a result of the sensing by sensor 110 and the lifestyle predicted by predictor 120, and outputs the information.

With this structure, an appropriate energy plan for the home is proposed. The resident of the home can thus recognize what to do as energy management in the home, with reference to the energy plan.

(2) For example, energy planning system 10 may further include measurer 203 that measures energy usage in the home, wherein proposer 150 determines the information about the energy plan based on a result of the measurement by measurer 203.

In this way, the energy plan can be proposed appropriately by predicting future energy usage based on the current or past energy usage in the home.

(3) For example, energy planning system 10 may further include obtainer 130 that obtains energy measure information indicating a present stipulation or a future plan relating to energy, from outside, wherein proposer 150 specifies at least one energy facility based on the energy measure information, and determines information indicating the specified at least one energy facility as the information about the energy plan.

In this way, the energy plan can be proposed in consideration of the effect of the current energy sale price, stipulation of a subsidy for facility introduction or the like, or future plan (energy measure).

(4) For example, the energy measure information may be information about a future energy price, and proposer 150 may specify the at least one energy facility effective in energy cost reduction based on the energy measure information, to determine the information about the energy plan.

In this way, the energy plan can be proposed in consideration of a future change in energy price, etc.

(5) For example, energy planning system 10 may further include storage 140 that stores facility price information indicating a price of each of one or more energy facilities, wherein proposer 150 calculates cost effectiveness of each of the one or more energy facilities based on the facility price information, specifies the at least one energy facility whose calculated cost effectiveness satisfies a predetermined criterion, and determines information indicating the specified at least one energy facility as the information about the energy plan.

In this way, the energy plan based on the cost effectiveness of the energy facility can be proposed.

(6) For example, the sensing of the state of the energy facility by sensor 110 may include sensing duration of use of the energy facility to present, and proposer 150 may determine the information about the energy plan based on the duration of use.

In this way, the energy plan based on the duration of use of the energy facility can be proposed.

(7) For example, energy planning system 10 may further include collector 202 that collects data about measured operation performance of one or more energy facilities in the home, wherein sensor 110 performs the sensing based on the data collected by collector 202, and predictor 120 performs the prediction based on the data collected by collector 202.

In this way, the energy plan can be proposed appropriately as the lifestyle can be objectively predicted based on the data measured by a HEMS.

(8) For example, predictor 120 may predict a change in lifestyle of the resident of the home, and proposer 150 may determine, as the information about the energy plan, information indicating an energy facility to be introduced or an energy-related service to be received at a time of the change in lifestyle predicted by predictor 120.

In this way, the energy plan necessary for the change in lifestyle can be proposed.

(9) For example, energy planning system 10 may further include input receiver 201 or 31 that receives input information indicating a future change of the resident of the home, wherein predictor 120 performs the prediction based on the input information received by input receiver 201 or 31.

In this way, the energy plan can be proposed appropriately as such prediction that responds to a future change in the resident of the home, which cannot be predicted from measurement data alone, is possible.

(10) An energy planning method according to an aspect of the present invention is an energy planning method executed by one or more computers, the energy planning method including: Step S2 of sensing a state of an energy facility in a home; Step S3 of predicting a future lifestyle of a resident of the home; and Step S7 of determining information about an energy plan for the home based on a result of the sensing in Step S2 and the lifestyle predicted in the predicting in Step S3, and outputting the information.

In this way, an appropriate energy plan for the home is proposed.

(11) A control program according to an aspect of the present invention is a control program for causing a computer to execute an energy planning process that includes: Step S2 of sensing a state of an energy facility in a home; Step S3 of predicting a future lifestyle of a resident of the home; and Step S7 of determining information about an energy plan for the home based on a result of the sensing in Step S2 and the lifestyle predicted in the predicting in Step S3, and outputting the information.

In this way, the computer can be caused to function as energy planning server 100 that formulates an energy plan.

(12) For example, energy planning system 10 may further include storage 140 that stores energy purchase price information indicating an energy purchase price in each of one or more energy-related services, wherein proposer 150 calculates cost effectiveness of each of the one or more energy-related services based on the energy purchase price information, specifies at least one energy-related service whose calculated cost effectiveness satisfies a predetermined criterion, and determines information indicating the specified at least one energy-related service as the information about the energy plan. For example, the predetermined criterion is that, in the case where the energy-related service requires an investment such as a purchase price for the introduction of a certain energy facility, the investment can be recouped within a certain period through a reduction in energy cost by the energy-related service. The cost effectiveness in this case is, for example, the effect of reducing energy cost with respect to the investment. The energy plan based on the cost effectiveness of the energy-related service can thus be proposed.

(13) For example, energy planning system 10 may further include storage 140 that stores facility price information indicating a price of each of one or more energy facilities and energy purchase price information indicating an energy purchase price in each of one or more energy-related services, wherein proposer 150 calculates cost effectiveness of each of the one or more energy facilities based on the facility price information and calculates cost effectiveness of each of the one or more energy-related services based on the energy purchase price information, specifies at least one energy facility and at least one energy-related service whose calculated cost effectiveness satisfies a predetermined criterion, and determines information indicating the specified at least one energy facility and at least one energy-related service as the information about the energy plan. In this way, the energy plan based on the cost effectiveness of the energy facility and energy-related service can be proposed.

(14) For example, the information about the energy plan determined by proposer 150 may include information indicating the energy facility to be introduced and information indicating the effect in the case of introducing the energy facility, or information indicating the energy-related service to be received and information indicating the effect in the case of receiving the energy-related service. The information indicating the effect may include, for example, information indicating any risk, advantage, or result of introduction in other homes. The resident of the home can thus recognize the effect in the case of executing the proposed energy plan.

(15) For example, proposer 150 may determine the information about the energy plan based on the provision period of any energy-related service received in the home to the present. In this way, the energy plan can be proposed according to the duration of the contract associated with the energy-related service.

(16) For example, energy planning system 10 may further include detector 160 that detects an energy plan necessity level indicating a level at which the resident of the home needs the proposal of the energy plan, wherein proposer 150 may determine the information about the energy plan depending on the energy plan necessity level detected by detector 160. The proposal corresponding to the necessity level of the resident of the home can be made in this way.

REFERENCE MARKS IN THE DRAWINGS

10 energy planning system
20a, 20b, 20c home
31, 201 input receiver
100 energy planning server (energy planning device)
110 sensor
120 predictor
130 obtainer
140 storage
150 proposer
160 detector
202 collector
203 measurer

The invention claimed is:

1. An energy planning method executed by one or more computers, the method comprising:
 obtaining a type of energy facility in a home and a duration of use of the energy facility;
 obtaining a past operation performance record of the energy facility in the home from a power measurement device of the home;
 obtaining ages of the residents;
 obtaining a time data, from a power measurement device of the home, the time data indicating a time zone of a day when the energy facility is operating;
 predicting a timing of a change in a total number of residents in the home on an annual basis, based on the past operation performance record;
 selecting, based on the obtained type, the obtained duration of use and the predicted timing of the change in the total number of the residents, at least one of a recommended energy facility or a recommended energy-related service to be introduced in the home to reduce an energy cost in the home;

generating plan information, which includes the at least one of the recommended energy facility or the recommended energy-related service; and outputting the plan information to a display, wherein:

in the obtaining the ages of the residents, the ages of the residents are estimated based on the time data, and in the predicting, predicting the timing of change in the total number of residents in the home based on the obtained ages of the residents in addition to the past operation performance record.

2. The energy planning method according to claim 1, further comprising:

determining a recommended timing of introducing the at least one of the recommended energy facility or the recommended energy-related service to the home based on the predicted timing of the change, wherein the plan information further includes the recommended timing of introducing the at least one of the recommended energy facility or the recommended energy-related service to the home.

3. The energy planning method according to claim 1, further comprising:

calculating a future energy cost for a duration including the predicted timing of the change at least based on the predicted timing, the total number of residents, and the at least one of the recommended energy facility or the recommended energy-related service; and in the outputting, further outputting the future energy cost to the display.

4. The energy planning method according to claim 1, further comprising:

calculating a reduction in energy cost for a duration including the predicted timing of the change at least based on the predicted timing, the total number of residents, the energy facility, and the at least one of the recommended energy facility or the recommended energy-related service; and in the outputting, further outputting the reduction in energy cost to the display.

5. The energy planning method according to claim 1, wherein:

a plurality of energy facilities are installed in the home, the energy facility constituting the plurality of the energy facilities, in the outputting, outputting the plan information and current information indicating at least one of the current number of the plurality of the energy facilities, the types of the plurality of the energy facilities, or operation statuses of the plurality of the energy facilities.

6. The energy planning method according to claim 1, wherein:

in the predicting, further predicting a change in the total number of residents at a first point in time and a second point in time, and the plan information includes a first plan information corresponding to the first point and a second plan information corresponding to the second point.

7. The energy planning method according to claim 1, wherein in the outputting, outputting the plan information to the display at a time of changing the total number of residents.

8. The energy planning method according to claim 1, wherein:

the operations further include obtaining past energy usage in the home from the power measurement device of the home, and in the selecting, the plan information is selected further based on the obtained past energy usage.

9. The energy planning method according to claim 1, wherein:

the operations further include storing facility price information indicating a price of each of one or more energy facilities, and in the selecting, cost effectiveness of each of the one or more energy facilities is calculated based on the facility price information, at least one energy facility whose calculated cost effectiveness satisfies a predetermined criterion is selected as the recommended energy facility.

10. The energy planning method according to claim 1, wherein:

in the obtaining the type of energy facility, the duration of use of the energy facility is obtained based on the past operation performance record.

11. The energy planning method according to claim 1, wherein in the obtaining the type of energy facility, the type of the energy facility and the duration of use of the energy facility are obtained based on an input from one of the residents.

12. The energy planning method according to claim 1, wherein in the obtaining the ages, obtaining the ages of the residents based an input from one of the residents.

13. The energy planning method according to claim 1, wherein the energy facility is a facility having a function of any of generating, retaining, and using energy.

14. An energy planning method executed by one or more computers, the method comprising:

obtaining a type of energy facility in a home and a duration of use of the energy facility;

obtaining a past operation performance record of the energy facility in the home from a power measurement device of the home;

obtaining ages of the residents;

obtaining a statistical data about an average age of marriage and an average age of childbirth;

predicting a timing of a change in a total number of residents in the home on an annual basis, based on the past operation performance record;

selecting, based on the obtained type, the obtained duration of use and the predicted timing of the change in the total number of the residents, at least one of a recommended energy facility or a recommended energy-related service to be introduced in the home to reduce an energy cost in the home;

generating plan information, which includes the at least one of the recommended energy facility or the recommended energy-related service; and outputting the plan information to a display, wherein in the predicting, predicting the timing of the change in the total number of residents in the home based on the obtained ages of the residents and the obtained statistical data in addition to the past operation performance record.

15. An energy planning method executed by one or more computers, the method comprising:

obtaining a type of energy facility in a home and a duration of use of the energy facility;

obtaining a current total number of residents in the home and current ages of the residents;

predicting a timing of a change in a total number of residents in the home on an annual basis, based on the current ages of the residents and at least one selected from the group consisting of a statistical data about an average age of marriage, a statistical data about an average age of childbirth, a statistical data about an average age of a child becoming independent, and a statistical data about average age of the child living with parents again, each of which is obtained from an external server;

selecting, based on the obtained type, the obtained duration of use and the predicted timing of the change in the total number of the residents, at least one of a recommended energy facility or a recommended energy-related service to be introduced in the home to reduce an energy cost in the home;

generating plan information, which includes the at least one of the recommended energy facility or the recommended energy-related service; and outputting the plan information to a display.

16. An energy planning method executed by one or more computers, the method comprising:

obtaining a type of energy facility in a home and a duration of use of the energy facility;

obtaining a current total number of residents in the home and current ages of the residents;

predicting a timing of a change in a total number of residents in the home on an annual basis, based on the current ages of the residents and at least one selected from the group consisting of a statistical data about an average age of marriage, a statistical data about an average age of childbirth, a statistical data about an average age of a child becoming independent, and a statistical data about average age of the child living with parents again, each of which is obtained from an external server;

determining, based on the obtained type, the obtained duration of use and the predicted timing of the change in the total number of the residents, plan information including at least one of a recommended energy facility or a recommended energy-related service to be introduced in the home to reduce an energy cost in the home; and outputting the plan information to a display.

17. An energy planning apparatus comprising:

a processor; and a memory storing a computer program, which when executed by the processor, causes the processor to perform operations including:

obtaining a type of energy facility in a home and a duration of use of the energy facility;

obtaining a past operation performance record of the energy facility in the home from a power measurement device of the home;

obtaining ages of the residents;

obtaining a time data, from a power measurement device of the home, the time data indicating a time zone of a day when the energy facility is operating;

predicting a timing of a change in a total number of residents in the home on an annual basis, based on the past operation performance record;

selecting, based on the obtained type, the obtained duration of use and the predicted timing of the change in the total number of the residents, at least one of a recommended energy facility or a recommended energy-related service to be introduced in the home to reduce an energy cost in the home;

generating plan information, which includes the at least one of the recommended energy facility or the recommended energy-related service; and outputting the plan information to a display, wherein:

in the obtaining the ages of the residents, the ages of the residents are estimated based on the time data, and in the predicting, predicting the timing of change in the total number of residents in the home based on the obtained ages of the residents in addition to the past operation performance record.

* * * * *